May 17, 1927.

A. A. DENNIS 1,629,452

FRICTION DRIVE MECHANISM

Filed Oct. 20, 1925   2 Sheets-Sheet 1

Inventor
Alfred A. Dennis
By
Frank E. Liverance, Jr.
Attorney.

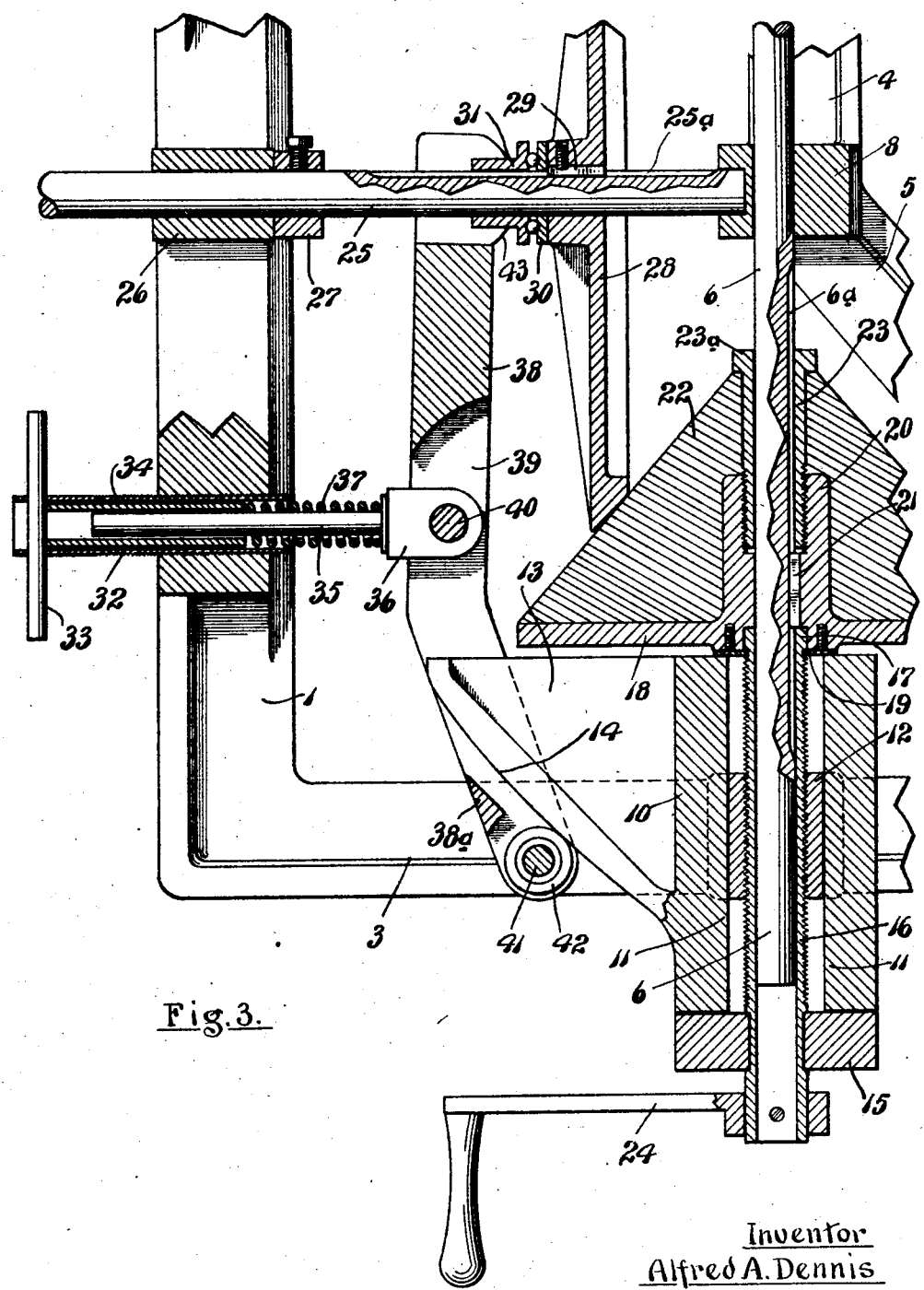

Patented May 17, 1927.

1,629,452

UNITED STATES PATENT OFFICE.

ALFRED A. DENNIS, OF GRAND RAPIDS, MICHIGAN.

FRICTION DRIVE MECHANISM.

Application filed October 20, 1925. Serial No. 63,583.

This invention relates to a variable speed friction drive mechanism whereby one shaft may be driven from another at an indefinite number of speeds between the highest and lowest at which it may be driven, the driving shaft operating at a constant speed. Of course the driving shaft may also be subject to variations in speed but the driven shaft is driven through the mechanism which I have invented, at anyone of said indefinite number of speeds with respect to whatever speed the driving shaft may be operated.

Friction drive mechanisms have been subject to many difficulties and it is a primary object and purpose of the present invention to provide a simple, compact, efficient and durable friction drive mechanism wherein, irrespective of the relative speeds of rotation of the driving and driven shafts, or the positions of the interengaging driving and driving members on said shafts, the pressure holding said members frictionally together remains substantially constant so that the drive at all speeds is affected under the necessary pressure which does not vary or change in intensity but remains substantially constant at all speeds.

The invention which I have devised and by means of which these ends above stated are attained, as well as many others not at this time specifically stated, is described in the following description and illustrated in the accompanying drawings in which:

Fig. 3 is an enlarged partial plan and horizontal section of the construction shown in Fig. 1, the section being taken through the operative parts of the mechanism.

Like reference characters refer to like parts in the different figures of the drawings.

Figure 1:
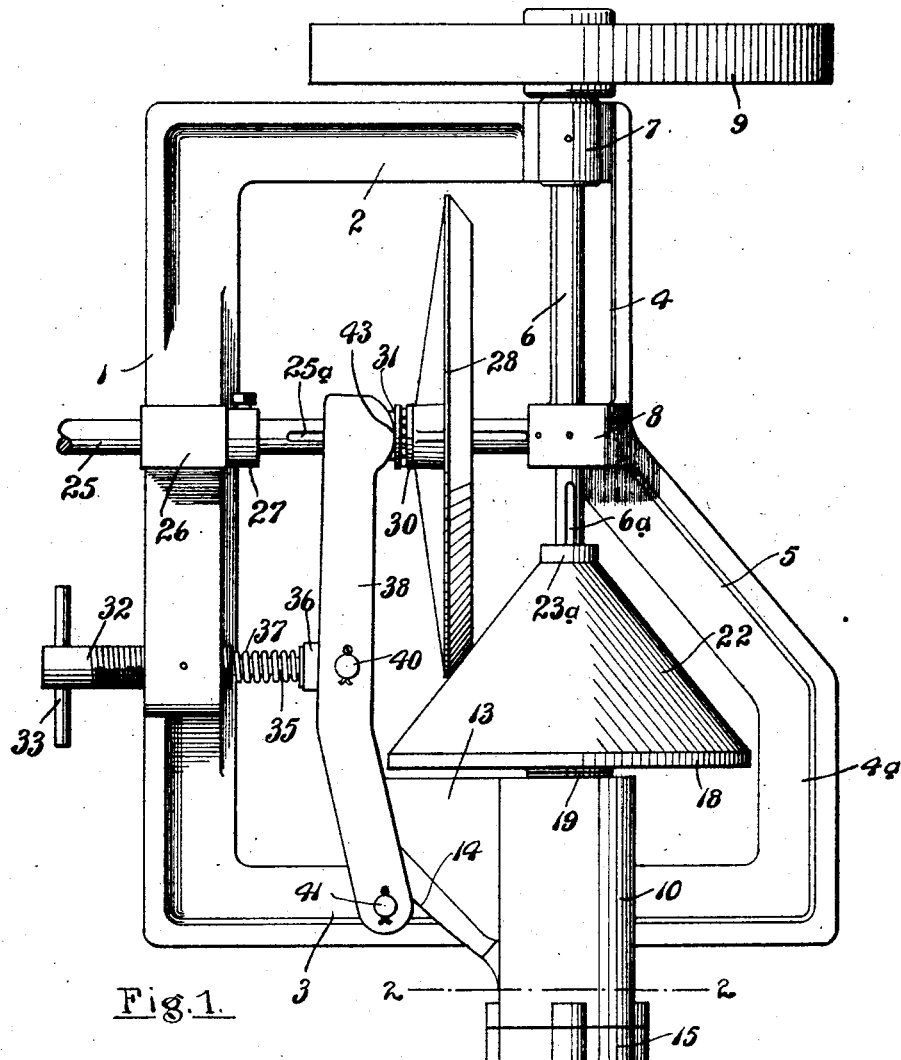
Fig. 1 is a plan view of the friction drive mechanism of my invention.
Figure 2:
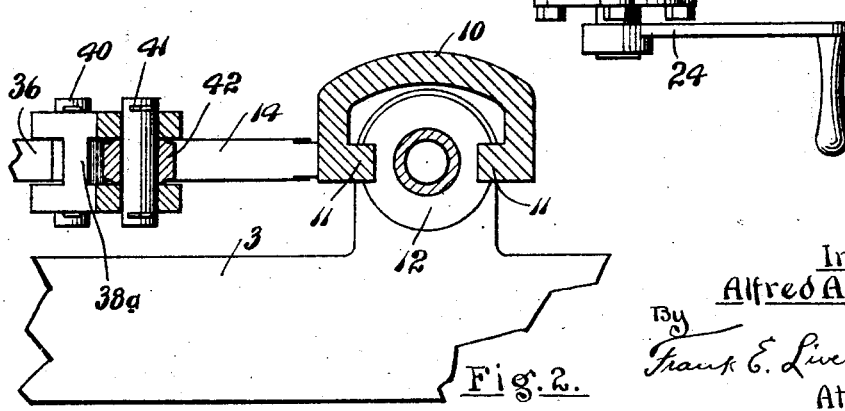
Fig. 2 is a somewhat enlarged vertical section on the plane of line 2—2 of Fig. 1.

In the construction shown, a supporting frame is provided having a side 1, spaced apart ends 2 and 3 extending at right angles from the ends of the side 1, and an additional side comprising two sections 4 and 4ª integrally connected by the inclined section 5 as fully shown in Fig. 1. This supporting frame may be attached to or formed as a part of the frame of any particular machine with which this drive is to be used.

A drive shaft 6 is mounted through suitable bearings 7 and 8 attached to or integral with the supporting frame described and as shown, the shaft 6 is located substantially above and parallel to the section 4 of the frame. This drive shaft may be operated by power from any suitable source of supply and is shown as carrying a pulley 9 for the reception of a belt which may be driven from said source of power. Of course this shaft 6 may be operated in any suitable manner from any source of power and the invention is not dependent in any way upon this or any other particular and specific method of operating the shaft 6.

In the side 3 of the frame and transversely thereof a member 10 is mounted comprising an upper portion with depending sides which are turned inward to form horizontal flanges 11 slidably mounted in an upwardly extending boss or projection 12 cast on the frame 3. This member 10 at one side has an integral cam member 13 with an outer surface 14 which is inclined and somewhat arcuate in outline, as shown, the purpose of which will later appear.

The boss or projection 12 has an interiorly threaded opening through it. A sleeve 16 is exteriorly threaded and passes through the boss and the shaft 6 freely received in the inner end of the sleeve 16. The outer end of the member 10 is provided with a cover or closing plate 15 bolted thereto through which sleeve 16 passes and has a rotatable mounting therein but one which holds the sleeve against any longitudinal movement with respect to the member 10, as is clearly evident from the construction shown in Fig. 3.

The sleeve 16 at its inner end is formed with a head 17 received in a recess at the center of a circular plate 18. A secure connection against disengagement is made between sleeve 16 and plate 18 through a retaining ring or washer 19 permanently secured to the plate 18 and having its inner edges received in a groove in sleeve 16. From the plate 18 at its central point a hub 20 extends inwardly which carries a spline 21 fitting into the key way 6ª cut lengthwise of the shaft 6. A conical body 22 is placed over sleeve 20 and against the plate 18 and is permanently secured in place by retaining sleeve 23 having a head 23ª, the inner end of the sleeve being exteriorly threaded so as to secure into the interiorly threaded end of the hub 20, the head 23ª bearing against the end of the body 22. This is a preferred construction of the cone pulley drive mounted on the drive shaft though it is evident that the structure of the cone pulley may be widely varied.

At the outer end of sleeve 16 a crank 24 is mounted. By turning this crank sleeve 16 is moved lengthwise through the boss 12 and the cone pulley is moved to different positions in the length of the shaft 6. At the same time the member 10 with its connected cam member 13 is moved back and forth with the cone pulley.

The driven shaft 25 is located at right angles to the drive shaft 6, its end being received in a suitable socket formed in the block 8 through which shaft 6 passes and said shaft 25 passing through a suitable bearing 26 on the side 1 of the supporting frame. A collar 27 is adjustably but rigidly connected to shaft 25 and serves as a thrust collar to take the longitudinal thrust on shaft 25, a side of the collar bearing against an end of the bearing 26. A cone pulley 28 is mounted on the shaft 25, its hub carrying a spline 29 slidably received in the key way 25ª of shaft 25. Pulley 28 at its conical outer surface bears against the conical body 22 of the driving cone pulley first described. A disk or washer 30 is located against the end of the hub of 28, ball bearings bear against this disk and a flanged collar 31 is located over the shaft 25 and holds the ball bearings against the disk 30, the construction for causing the flanged collar to bear in the direction of the pulley later appearing.

A tubular exteriorly threaded sleeve 32 is threaded through the side 1 of the supporting frame, parallelling the shaft 25 and located a distance therefrom or substantially midway between said shaft and the end 3 of the frame. A rod 33 passes through the outer end of the sleeve 32 serving as a handle to turn the sleeve for adjustment. A sleeve 34 of smaller diameter and less length is located within the sleeve 32, its outer end bearing against the handle 33. A rod 35 extends freely into the sleeves 32 and 34 and at its projecting end is provided with a head 36. A relatively heavy coiled spring 37 is located around the rod 35 between head 36 and the end of the sleeve 34.

A lever 38 is located substantially within the side 1 of the supporting frame between shaft 25 and the cam member 13 previously described. This lever is horizontally slotted as indicated at 39 between its upper and lower sides, the head 36 extending into the slot and a pivot pin 40 passing through the lever and said head. The slot extends to the outer end of the lever 38 and is continuous except for the strengthening rib 38ª shown in Fig. 3 so that the cam member 13 may pass therein or through the slot. A pin 41 is located across said slot at the outer end of lever 38 on which a roller 42 is mounted to bear against the shaft 14 of cam member 13. The opposite inner end of lever 38 is likewise slotted for a distance and a head is formed having arc shaped inner sides 43 bearing against the flange of the collar 31, the slot in the head permitting the passage of shaft 25 and the sleeve of said flanged collar.

By adjusting the position of the sleeve 32, spring 37 may be tensioned a greater or lesser amount as may be desired. The force of the spring is transmitted through the lever 38 and through the flanged collar 31 to the pulley 28 and it is evident that the collar 41 is pressed by the influence of said spring against the cam surface 14. This provides the necessary and effective pressure between the engaging surfaces of the driving and driven cones. When it is desired to vary the speed of the driven shaft the crank 24 is operated in the desired direction. If the crank is operated so as to move the driving cone pulley inward and thereby force the driven pulley 28 outward, simultaneously with this outward movement of the pulley 28 member 10 with cam member 13 moves inward permitting the lever 38 to turn on the pivot 40 but holding the pivot 40 substantially in the relative position which it occupies at all times with respect to the frame member 1. That is, spring 37 is neither increased nor decreased in the force with which it operates to press the pulley 28 against the body 22 of the driving pulley. And with any other change of position of the driving and the driven pulleys on their respective shafts the tilting of the lever 38 is controlled in such manner that the pivot 40 of the lever makes no change in its relative position to the supporting frame. Accordingly at all times there is a constant and practically unvaried pressure of the driven pulley 28 against the body 22 of the driving pulley irrespective of the position which the two pulleys may occupy relative to each other.

This construction of friction drive mechanism is one of value and has proven its merit in practice. The construction is comparatively simple, is a practical and operative one, occupies little space and no additional space over that required for the support of the pulley and shafts, and is inherently durable and efficient in service. It solves the problem of maintaining a constant pressure force between the engaging surfaces of the frictionally contacting pulleys at whatever relative speeds they may be operating and does this in an especially simple, practical and workmanlike manner. The invention is defined in the appending claim and is to be considered as comprehensible of any venture coming within its scope.

I claim:

1. In combination, a driving shaft, a driven shaft, a cone pulley splined on the driving shaft, a cone pulley splined on the driven shaft and frictionally engaging the first pulley, means for shifting the said pulleys on their shafts for changing the speed of the driven shaft with respect to the speed of the driving shaft, a member mounted to bear against the driven pulley to force it into frictional engagement with the driving pulley, spring means acting on said member and means shiftable with the driving pulley against which the member bears for maintaining the force of the spring against said member constant at all positions of the pulleys with respect to each other.

2. In combination with a supporting frame, a driving shaft mounted thereon, a driven shaft positioned at right angles to the driving shaft and mounted on said frame, a cone pulley splined on the driving shaft, a second pulley splined on the driven shaft and bearing against the first pulley, means for shifting the driving pulley to different positions on the driving shaft thereby automatically shifting the driven pulley to different positions on the driven shaft, a lever pivotly mounted between its ends, a compression spring disposed between the lever and the frame, one end of said lever bearing against the driven pulley to force it against the driving pulley, and means including a cam member connected and shiftable with the driving pulley against which the other end of the lever bears, whereby in the shifting of said pulleys to different positions the pivot of said lever remains substantially fixed with respect to the supporting frame and the tension of said spring remains substantially constant.

3. In combination, a supporting frame, two shafts located at right angles to each other rotatably mounted on said frame, a pulley splined on each shaft, the surfaces of the pulleys bearing against each other, a member slidably mounted on the frame and connected with one of said pulleys, said member at one side being formed with a cam member having an inclined surface, means for manually moving said member and the attached pulley back and forth in a directional parallel to the axis of the shaft on which said pulley is mounted, a lever having one end bearing against the other pulley and the other end bearing against said inclined cam surface, a rod to which the lever is pivotly connected at a point between the ends of said lever and a spring acting on the lever and disposed around said rod, said rod at one end being received and guided through the supporting frame.

4. In combination, a supporting frame, two shafts rotatably mounted thereon and located at an angle to each other, a pulley splined on each shaft, a member connected to one of said pulleys, means for slidably mounting said member on the frame whereby it and the attached pulley may be moved back and forth in a direction parallel to the axis of the shaft on which the pulley is mounted, a cam member having a cam outer surface connected with said first member, a sleeve threaded through the frame at one side, a rod extending into said sleeve, said rod having a head at its inner end, a coil spring under compression around the rod between the sleeve and said head, a lever pivotally mounted between its ends to said head, one end of the lever bearing against the other of said pulleys and the other end of the lever riding on the cam surface of the member attached to the first pulley.

5. A friction driving mechanism comprising a driving shaft, a driven shaft extending at right angles thereto, a friction cone pulley splined to the driving shaft, a friction driven pulley splined to the driven shaft, a member movable parallel with the driving shaft connected to the driving pulley, a cam surface on said movable member, a lever engaging said cam surface and said driven pulley and spring means acting upon said lever between its ends whereby uniform frictional pressure is maintained between the pulleys at all of their relative positions.

In testimony whereof I affix my signature.

ALFRED A. DENNIS.